3,183,280
HYDROCARBON CONVERSION PROCESS
AND CATALYST
William Schoen, Houston, Tex., and Joe T. Kelly, Lake Charles, La., assignors to Standard Oil Company, Chicago, Ill., a corporation of Indiana
No Drawing. Filed Jan. 8, 1962, Ser. No. 165,278
15 Claims. (Cl. 260—683.76)

This invention relates to a catalyst for the conversion of hydrocarbons. More particularly, it relates to the isomerization of less branched hexanes to more highly branched hexanes using a catalyst comprising a Friedel-Crafts halide and an organophosphorous acid.

As the compression ratios of automobile engines are increased and higher horsepower and more efficient engines are being developed, specifications of gasolines are more stringent so as to require higher quality in respect to octane number and volatility than has previously been necessary. One of the petroleum refining processes available to refiners for producing high octane blending stocks is the isomerization of paraffins, particularly light paraffins. The light paraffins which are normally available for blending in gasoline have an octane number rating in the range of 60 to 80. In the case of hexanes, the dimethyl butanes have octane numbers in the range of 100 or higher, while the methyl pentanes and normal hexanes have an octane number of less than 80.

Thus it is highly desirable to isomerize normal hexanes to the dimethyl butanes in order to produce high octane, high volatility blending stocks.

Known isomerization processes utilized acid catalysts such as the Friedel-Crafts halides. These can be used in a liquid complex with hydrocarbon, with or without promoters, such as antimony trichloride or they may be used in a fixed bed system wherein the aluminum chloride is deposited upon a support. In either case the acid catalyst must be activated by a hydrogen halide such as hydrogen chloride. The isomerization can be carried out with the hydrocarbon in the liquid phase or vapor phase. Each of the known catalysts for isomerization of petroleum fractions has specific disadvantages. Thus, researchers in this field are constantly seeking improved isomerization catalyst systems.

We have discovered a new and novel catalyst system for the conversion of hydrocarbons, particularly the isomerization of $C_4$ to $C_7$ paraffins. Our catalyst is comprised of a mixture of a Friedel-Crafts halide and an organophosphorous acid. Particularly useful as the Friedel-Crafts agent are aluminum chloride and titanium tetrachloride. Much to our surprise our new catalyst does not need to be activated with a hydrogen halide as is the case when using a Friedel-Crafts halide alone.

While we do not know the exact form of our catalyst and do not want to be bound by any specific explanation, we believe that the Friedel-Crafts agent and the organophosphorous acid form a complex. During the isomerization reaction this catalyst complex releases a proton from the organophosphorous acid to initiate a carbonium ion chain reaction which results in the isomerization of the hydrocarbon. Our new catalysts will not only isomerize paraffins but will also isomerize cycloparaffins and cause double bond isomerization of olefins. Likewise, it may be used for the polymerization of olefins, alkylation of isoparaffins and aromatic hydrocarbons with olefins.

The components of our new catalyst are solid at room temperature. They may be used in the solid state if the specific reaction temperature is relatively low, in order of less than 100° F. Generally, at higher temperatures in the order of 150° F. or higher, the components will be molten. In this state they may be used as a liquid phase catalyst in the usual batch type reactor or in a continuous reactor designed for liquid catalyst operation. Alternatively, it may be found useful to deposit the mixture of the two components, i.e., the complex, upon the surface of a porous solid support. In this manner fixed bed continuous operations may be carried out. The solid support may be impregnated with the organophosphorous acid after which the Friedel-Crafts halide may be sublimed onto the surface or the carrier may be contacted with a mixture of the two in the molten state. Carriers which are suitable as supports are bauxite, alumiunas, crushed firebrick, charcoal, silica gel, etc. Except when using our new catalyst in the supported form, there is no need for preforming the catalyst. Thus in a batch operation the Friedel-Crafts halide and the organophosphorous acid may be added to the reactor along with the reactants and the reaction mass heated to reaction temperature. Our new catalyst is normally liquid at the reaction temperature and can be stirred or other known means used for contacting the reactants with the catalyst. We have found that the operating techniques generally used for Friedel-Crafts catalyzed reactions are suitable for use with our catalyst.

In the formation of our catalyst the organophosphorous acids which may be used are primary and secondary phosphonic acids [$RP(O)(OH)_2$ and $R_2P(O)(OH)$], phosphonous acids [$RP(O)H(OH)$], and phosphinous acids ($R_2POH$). Examples of such acids are trichloromethyl phosphonic acid, fluoromethyl phosphonic acid, benzene phosphonous acid, methyl phosphonic acid, benzene phosphonic acid, and ethyl phosphonous acid. Particularly useful are benzene phosphonic acid, benzene phosphinic acid and chloromethyl phosphonic acid.

Friedel-Crafts halides which are useful as the second component of our new catalyst are the class of metal halides which are commonly known as Friedel-Crafts catalyst. Examples of these are aluminum trichloride, titanium tetrafluoride, antimony pentachloride, ferric trichloride, aluminum tribromide, and titanium tetrachloride.

The use of organophosphorous acid in conjunction with a Friedel-Crafts halide as an isomerization catalyst has the advantage of reducing corrosion, which is very pronounced in systems needing hydrogen halide as a catalyst activator.

Reaction conditions will vary with the process under consideration but, in general, we have found that conditions to be applied are those most commonly used for the particular type reaction being carried out. In the case of isomerization, the following ranges of conditions are preferred:

Feed _____ $C_5$ to $C_7$ paraffin hydrocarbons.
Wt. ratio of catalyst components:
   Friedel-Crafts halide to organophosphorous acid _____ 0.2:1 to 2:1.
Reaction temperature, ° F. _____ 100 to 250.
Reaction time, hours _____ 0.5 to 6.

The usefulness of our new catalyst combination was demonstrated in a series of hydrocarbon isomerization reactions utilizing a rocker-type steel bomb. The carbon steel bomb, having a capacity of 1500 ml., was fitted with a dip-leg and dried thoroughly before using. A 700 ml. charge of 2-methyl pentane and 3.5 ml. of pentene-2 was placed in the bomb for each run and the catalyst being tested was added to the mixture. The bomb was capped, pressured with hydrogen, placed in a rocker and heated with rocking for 6 to 7 hours. At the end of this time the bomb was allowed to come to room temperature and the hydrocarbon was released through the dip-leg into another bomb containing anion exchange resin. Neutralization by the resin in the latter bomb was followed by passage into a third and final bomb from which the hydrocarbon was removed after chilling to a low temperature. Analysis of the hydrocarbon product was accomplished by vapor fractometry. The conditions used and the data obtained in each run are shown in the following table:

*Isomerization of 2-methyl pentane with organophosphorous acids and $AlCl_3$ and $TiF_4$*

| Run No. | 1 | 2 | 3 | 4 | 5 | 6 |
|---|---|---|---|---|---|---|
| Catalyst | $TiF_4$ | $TiF_4$ | $AlCl_3$ | $AlCl_3$ | $AlCl_3$ | $AlCl_3$ |
| Catalyst, gm | 100 | 100 | 100 | 100 | 100 | 100 |
| Co-catalyst | None | [1] BPO | None | [1] BPO | [2] BPI | [3] CPA |
| Co-catalyst, gm | | 128 | | 83 | 125 | 49 |
| Temp., °F | 200 | 200 | 175 | 200 | 200 | 175 |
| Time, Hours | 6.5 | 6.5 | 5.5 | 7 | 6 | 6.5 |
| Prod. Distr., Vol. Percent: | | | | | | |
| $C_5$+Light Ends | | 27.2 | 38.6 | 40.0 | 9.1 | 71.1 |
| $C_6$ | 99.7 | 38.4 | 46.5 | 40.5 | 88.9 | 26.0 |
| $C_7$+ | .3 | 34.4 | 14.9 | 19.0 | 2.1 | 2.7 |
| Hexane Distr., Vol. Percent: | | | | | | |
| 2,2-$Me_2C_4$ | | 11.5 | 9.8 | 31.4 | 1.8 | 37.4 |
| 2,3-$Me_2C_4$ | 5.1 | 19.3 | 15.9 | 13.7 | 12.4 | 10.7 |
| 2-$MeC_5$ | 94.9 | 49.8 | 48.3 | 34.0 | 58.9 | 30.6 |
| 3-$MeC_5$ | | 19.4 | 22.2 | 16.6 | 26.9 | 13.6 |
| $nC_6$ | | | 3.8 | 4.3 | | 7.2 |

[1] Benzene phosphonic acid.
[2] Benzene phosphinic acid.
[3] Chloromethyl phosphonic acid.

Examination of the above data will show that the use of titanium tetrafluoride in combination with benzene phosphinic acid in Run 2 yields a substantial conversion of the 2-methyl pentane to the dimethyl butanes whereas the use of titanium tetrafluoride alone in Run 1 under the same conditions as in Run 2 gave essentially no isomerization. While in Run 3, where aluminum chloride was used alone, conversion of the 2-methyl pentane to the dimethyl butanes was attained, substantially better product distribution was obtained in Runs 4, 5 and 6 when the aluminum chloride was modified with an organophosphorous acid. In Run 4 a 40.5% yield of a $C_6$ fraction was obtained containing 45.1% dimethyl butanes, whereas in Run 3 the $C_6$ fraction of the product was 46.5% and contained only 25.7% dimethyl butanes. Although in Run 5 only 12.4 of the $C_6$ fraction was dimethyl butanes, very little cracking of the feed was obtained since the run yielded 88.9% $C_6$ fraction. Calculation will show that the conversion of 2-methyl pentane to the dimethyl butanes was higher in Run 5 when considering the overall yield.

While we have shown our new catalyst to be useful as an isomerization catalyst for the conversion of less branched light paraffin hydrocarbons to more highly branched paraffin hydrocarbons, it should be understood that our catalyst is likewise useful for other reactions where the modified acid catalyst is desirable to avoid a highly active catalyst which causes side reactions such as cracking. Also, it should be appreciated that the use of our combination catalyst enables hydrocarbon conversion using Friedel-Crafts halides which need not be activated with a hydrogen halide.

Having thus described our invention, what we claim is:

1. A catalyst for hydrocarbon conversion consisting essentially of a Friedel-Crafts halide and an organophosphorous acid.

2. The catalyst of claim 1 wherein the weight ratio of Friedel-Crafts halide to organophosphorous acid is between about 0.2:1 to 2:1.

3. The catalyst of claim 1 wherein the Friedel-Crafts halide is aluminum chloride.

4. The catalyst of claim 1 wherein the Friedel-Crafts halide is titanium tetrafluoride.

5. The catalyst of claim 1 wherein the organophosphorous acid is benzene phosphonic acid.

6. The catalyst of claim 1 wherein the organophosphorous acid is benzene phosphinic acid.

7. The catalyst of claim 1 wherein the organophosphorous acid is chloromethyl phosphonic acid.

8. A process of isomerizing less branched paraffin hydrocarbons to more highly branched paraffin hydrocarbons, which process comprises contacting the paraffin hydrocarbon charge with a catalyst comprising a Friedel-Crafts halide and an organophosphorous acid in a weight ratio of between about 0.2:1 to 2:1, at a reaction temperature of between about 100° F. to 250° F. for between about 0.5 to 6 hours, and recovering therefrom a product which is substantially more highly branched than the feed.

9. The process of claim 8 wherein the Friedel-Crafts halide is aluminum chloride.

10. The process of claim 8 wherein the Friedel-Crafts halide is titanium tetrafluoride.

11. The process of claim 8 wherein the organophosphorous acid is benzene phosphonic acid.

12. The process of claim 8 wherein the organophosphorous acid is benzene phosphinic acid.

13. The process of claim 8 wherein the organophosphorous acid is chloromethyl phosphonic acid.

14. A process for isomerization of a paraffin hydrocarbon of from 4 to 7 carbon atoms which comprises contacting the said hydrocarbon in a reaction zone with a catalyst comprising a Friedel-Crafts halide and an organophosphorous acid present in a weight ratio between about 0.2:1 to 2:2, at a temperature in the range of about 100° F. to 250° F., and removing isomerization product from the reaction zone.

15. The process of claim 14 wherein a highly branched fraction is separated from the isomerized product and a lesser branched fraction is recycled to the feed to the isomerization zone.

References Cited by the Examiner

UNITED STATES PATENTS

| 2,436,484 | 2/48 | Pines | 260—683.76 |
| 2,898,390 | 8/59 | Kelly et al. | 260—671 XR |
| 2,962,487 | 11/60 | Coover et al. | 252—431 |

ALPHONSO D. SULLIVAN, *Primary Examiner.*